No. 768,656. Patented August 30, 1904.

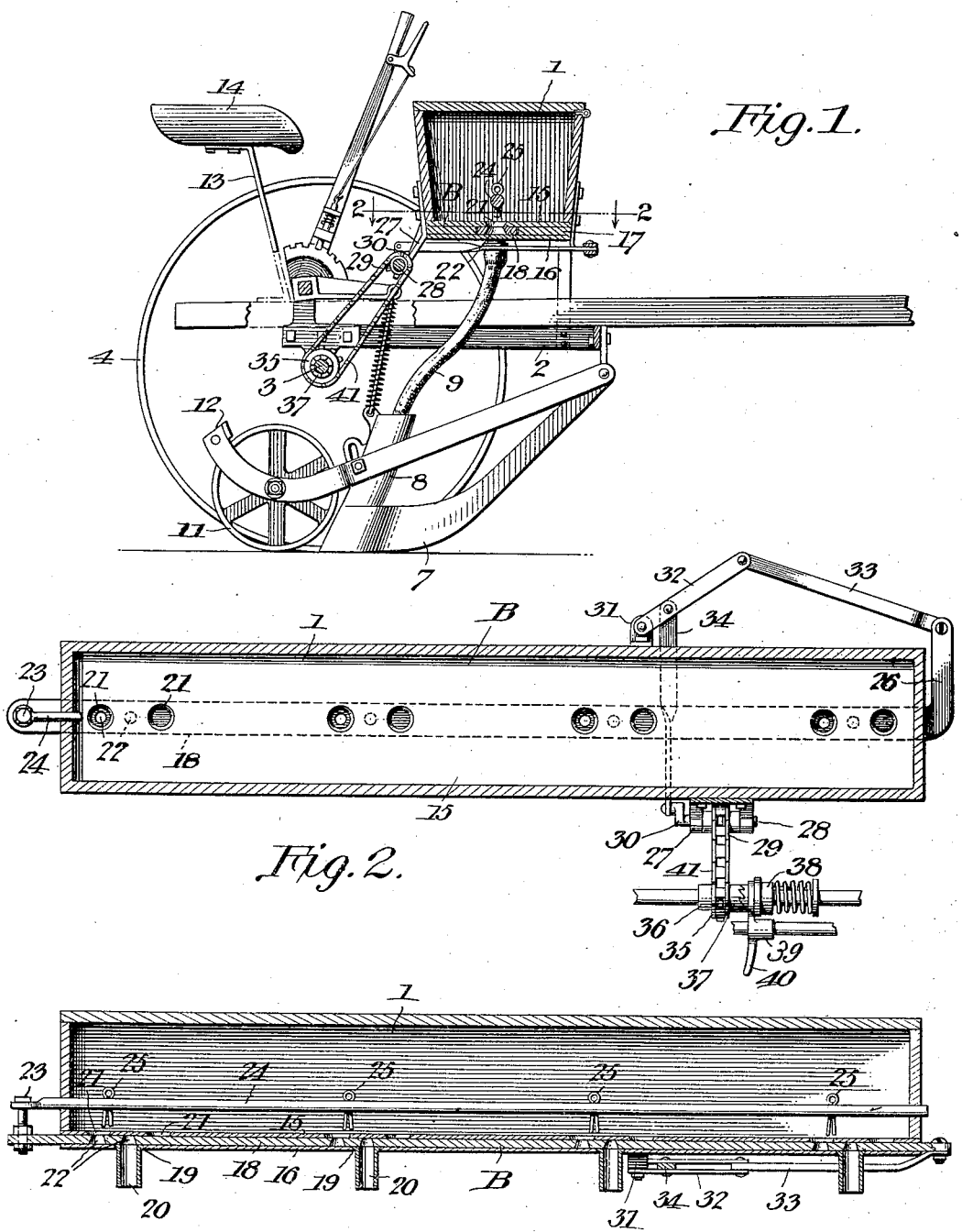

UNITED STATES PATENT OFFICE.

WILHELM G. DANIELSEN, OF LOGAN, UTAH.

SEED-PLANTER.

SPECIFICATION forming part of Letters Patent No. 768,656, dated August 30, 1904.

Application filed June 22, 1904. Serial No. 213,702. (No model.)

*To all whom it may concern:*

Be it known that I, WILHELM G. DANIELSEN, a citizen of the United States, residing at Logan, in the county of Cache and State of Utah, have invented a new and useful Seed-Planter, of which the following is a specification.

This invention relates to seed-planters, and more especially to that class of seed-planters which are used for planting the seed of sugar-beets.

By the customary method of planting sugar-beet seed the latter is planted in drills, and it subsequently becomes necessary to thin or to block the rows of plants in order to form hills or stands which may be successfully cultivated. This naturally involves much extra labor and expense.

By my present invention I provide a beet-seed planter whereby the seeds shall be deposited in hills suitably spaced apart and with much regularity and accuracy.

With this and other ends in view the invention consists in the improved construction and novel arrangement and combination of parts, which will be hereinafter described, and particularly pointed out in the claims.

In the accompanying drawings has been illustrated a simple and preferred form of embodiment of the invention, it being understood, however, that no limitation is necessarily made to the precise structural details therein described, but that any changes, alterations, and modifications which come fairly within the scope of the invention and which may be resorted to without departing from the spirit or sacrificing the efficiency of the same may be made.

In said drawings, Figure 1 is a vertical longitudinal sectional view of a machine constructed according to the principles of the invention. Fig. 2 is a horizontal sectional view of the seedbox and related parts. Fig. 3 is a vertical sectional view of the seedbox and related parts.

Corresponding parts in the several figures are indicated by similar characters of reference.

The present invention relates altogether to the seed-dropping mechanism of the improved planters; but in order that the invention may be perfectly understood other related parts have been shown, especially in Fig. 1, where 1 represents the seedbox, which is supported upon the frame 2, having bearings for the axle 3, said axle being provided with spindles upon which the transporting-wheels 4 are suitably mounted. A frame is provided with the front part of which the furrow-openers 7 are suitably connected, said furrow-openers consisting of shoes having seed-tubes 8 connected therewith, said seed-tubes being connected by flexible tubes 9 with the discharge-openings of the seedbox. The shoes also carry covering-wheels 11 and scrapers 12. An upright 13, suitably connected with the frame, supports the seat 14. Suitable means of well-known construction are also provided whereby the shoes may be set into or elevated above the ground, as may be required.

The seedbox 1 is of the customary rectangular form. Its bottom, which is generally designated B, is composed of an upper plate 15, a lower plate 16, and intermediate spacing members 17, between which is located a seed-slide 18. The bottom plate 16 is provided with openings 19, surrounded by spouts 20, said openings and spouts being spaced apart equal to the distance between the rows that are to be planted. The top plate 15 is provided with openings 21, which are twice as numerous as the openings 19 in the bottom plate, with relation to which they are so disposed that one of the openings 19 shall be disposed centrally between each pair of openings 21. The seed-slide 18 is provided with seed cups or cells 22, which may be of any size in order that any desired number of seeds may be deposited at each operation. The seed cups or cells 22 are frusto-conical in shape, tapering upwardly, as shown, this being for the purpose of preventing any possibility of seeds becoming stuck or caught therein, it being obvious that seeds that will enter the narrow upper ends of the seed-cups will be readily discharged through their enlarged lower ends.

The seed-slide 18 is extended at both ends of the box. At one end it is provided with an upwardly-extending bracket 23, connected with a guide-rod 24, which extends longitudinally through the seedbox and which is preferably provided with fingers or agitators 25, whereby the contents of the box may be stirred, so that they will readily enter into the openings 21 in the plate 15 and pass from thence to the seed cups or cells 22. The guide-rod 24 extends through and is guided in both ends of the seedbox, as will be seen. The end of the seed-slide opposite to that which supports the bracket 23 is provided with an arm 26, extending laterally in the plane of the seed-slide either in a forward or rearward direction. In the illustration this arm has been shown as being extended forwardly in order to meet the conditions of the operating mechanism; but it is very obvious that by making very simple changes wholly within the skill of an ordinary mechanic the location of the operating parts may be reversed, thereby necessitating the extension of the arm 26 of the seed-slide in an opposite direction to that shown in the drawings.

Suitably mounted upon the rear side of the hopper is a bracket 27, affording bearings for a shaft 28, carrying a sprocket-wheel 29 and provided at one of its ends with a crank 30. Suitably secured upon the front side of the seedbox is a bracket 31, with which is pivotally connected a lever 32, the free end of which is connected by a link 33 with the arm 26 of the seed-slide. A pitman 34 connects the lever 32 with the crank 30 of the shaft 28, one end of said pitman being connected with the lever 32 loosely, so that no difficulty may be experienced in operating the machine.

Motion is transmitted to the sprocket-wheel 29 from a sprocket-wheel 35 upon a sleeve 36, which may be mounted loosely upon the shaft and which carries a clutch member 37, adapted to engage a slidable spring-actuated clutch member 38, which may be pushed out of engagement with the clutch member 37 by means of a slide 39, mounted upon one of the frame-bars. This slide has a foot-piece 40, enabling it to be readily actuated by the driver. A chain 41 connects the sprocket-wheel 35 with the sprocket-wheel 29. While this simple means for transmitting motion from the axle of the machine to the seed-dropping mechanism may usually be preferred, yet I desire it to be understood that I do not necessarily limit myself to the specific means described.

When the machine is in operation and travels over the ground, the shaft 28 receives rotary motion in the manner described and the crank 30, transmitting motion through the pitman 34 and the oscillatory lever 32, serves to impart, through the link 33, a reciprocatory motion to the seed-slide, the arm of which, 26, is connected pivotally with the link 33. Owing to the relative arrangement of the seed cups or cells 22 and the openings 21 in the bottom plate 15, one of each pair of seed-cells will receive a charge from one of the openings 21 at the end of each limit of the stroke or movement of the seed-slide. At the same time the other seed cup or cell of each pair will be in alinement with the intermediate opening 19, through which the charge passes into the flexible tube 9, connected with the flange 20, and thence to the seed-tube 8, whereby it is conveyed to the furrow, which has been opened in advance. When the seed-slide reaches the opposite limit of its movement, the position of the seed-cells 22 of each set will be reversed—that is to say, the one which receives a charge of seed will now become carried into registry with the drop-opening 19, while the one which was formerly in registry with said opening will be carried into registry with one of the feed-openings 21.

Owing to the peculiar construction of the slide-operating mechanism, the seed-slide will remain practically stationary for a short space of time at the end of each limit of the stroke, and ample time will thus be afforded for one of the cells to receive the charge, while the charge is caused to pass from the other cell of each pair. The latter operation will be facilitated owing to the fact that the seed cups or cells are tapered or enlarged downwardly, as shown, thus making it impossible for the seeds to hang or to become choked therein.

The guide-rod of the device, which moves in concert with the reciprocatory seed-slide, is provided, as herein stated, with agitating-fingers which serve to stir the contents of the box, so that the said contents will invariably pass into the cells or seed-cups in the manner described. The agitators 25 may consist simply of cotter-pins inserted through vertical openings in the guide-rod, and the latter, in addition to supporting the agitators, serves as a means for guiding the slide, so as to reduce the liability of the latter becoming frictionally engaged with the spacing-blocks 17.

Having thus described the invention, what is claimed is—

1. In a seed-planter, a hopper having a bottom composed of upper and lower plates and spacing members interposed between said plates, said plates having openings therein, in combination with a reciprocatory slide having seed-cups adapted to carry seed from the openings in the upper plate to the discharge-openings in the bottom plate, a guide-rod extending through the ends of the hopper and connected with one end of the seed-slide, and agitating-fingers connected with said guide-rod.

2. In a seed-planter of the class described, a hopper having a bottom comprising bed-plates spaced apart, the upper plate being provided with pairs of perforations and the lower plate being provided with single perforations disposed intermediately between the perforations of each pair in the top plate, a seed-slide mounted for reciprocation between the top and bottom plates and the spacing members, an arm extending from one end of said seed-slide, a bracket member secured to the hopper, a crank-shaft journaled in said bracket member, a bracket member secured to the opposite side of the hopper, a lever connected with said bracket member, a pitman connecting said lever with the crank of the crankshaft, a link connecting the end of the lever with the end of the arm upon the seed-slide, and means for transmitting rotary motion to the crank-shaft, whereby reciprocatory motion will be so imparted to the seed-slide that, at the limit of its movement in either direction, a momentary stoppage will take place.

In testimony that I claim the foregoing as my own I have hereto affixed my signature in the presence of two witnesses.

WILHELM G. DANIELSEN.

Witnesses:
ORSON SMITH,
OLAF I. PEDERSEN.